(12) United States Patent
Ambrosina et al.

(10) Patent No.: US 6,668,641 B2
(45) Date of Patent: *Dec. 30, 2003

(54) APPARATUS AND METHOD FOR THERMAL DISSIPATION IN A THERMAL MASS FLOW SENSOR

(75) Inventors: Jesse Ambrosina, Topsfield, MA (US); Ali Shajii, Canton, MA (US)

(73) Assignee: MKS Instruments, Inc., Andover, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/032,259

(22) Filed: Dec. 21, 2001

(65) Prior Publication Data

US 2003/0115950 A1 Jun. 26, 2003

(51) Int. Cl.[7] .............................. G01F 1/68; G01F 5/00
(52) U.S. Cl. ....................................... 73/202.5; 73/202
(58) Field of Search .............................. 73/202, 202.5, 73/861.52, 861.51, 204.17, 204.19, 204.21, 861.63, 861.64

(56) References Cited

U.S. PATENT DOCUMENTS

| | | | |
|---|---|---|---|
| 3,851,526 A | 12/1974 | Drexel | 73/202 |
| 3,938,384 A | 2/1976 | Blair | 73/202.5 |
| 4,464,932 A | 8/1984 | Ewing et al. | 73/202.5 |
| 4,519,246 A | 5/1985 | Hartemink | 73/202.5 |
| 4,548,075 A | 10/1985 | Mariano | 73/202 |
| 5,279,154 A * | 1/1994 | Vavra et al. | |
| 5,461,913 A | 10/1995 | Hinkle et al. | 73/204.25 |
| 5,792,952 A | 8/1998 | Ritchart | 73/204.27 |
| 5,803,507 A | 9/1998 | Vu | 285/23 |
| 5,804,717 A | 9/1998 | Lucas | 73/202 |
| 6,038,921 A | 3/2000 | McMillan et al. | 73/204.23 |
| 6,044,701 A | 4/2000 | Doyle et al. | 73/202.5 |
| 6,062,077 A | 5/2000 | Azima | 73/202.5 |

* cited by examiner

Primary Examiner—Harshad Patel
(74) Attorney, Agent, or Firm—McDermott, Will & Emery

(57) ABSTRACT

A thermal mass flow controller includes a sensor assembly, a valve assembly, and a mass flow controller housing. A thermally conductive element conducts heat from the valve assembly away from the sensor assembly, thereby reducing uncontrolled contributions of heat to the sensor assembly.

11 Claims, 4 Drawing Sheets

APPARATUS AND METHOD FOR THERMAL DISSIPATION IN A THERMAL MASS FLOW SENSOR

RELATED APPLICATIONS

Patent applications entitled, "Method and Apparatus For Thermal Isolation Of A Thermal Mass Flow Sensor", having inventors, Jesse Ambrosina and Isao Suzuki, (Attorney Docket No. MKS-92) and "Apparatus and Method For Thermal Management of A Mass Flow Controller", having inventors, Jesse Ambrosina, Isao Suzuki, and Ali Shajii, (Attorney Docket No. MKS-94), assigned to the same assignee as this application and filed on even date herewith are hereby incorporated by reference in their entirety.

FIELD OF THE INVENTION

The present invention relates to mass flow measuring systems and, more particularly, to mass flow sensor housings that substantially eliminate thermal gradients that might otherwise be imposed upon a mass flow sensor.

BACKGROUND OF THE INVENTION

Capillary tube thermal mass flow sensors exploit the fact that heat transfer to a fluid flowing in a laminar tube from the tube walls is a function of mass flow rate of the fluid, the difference between the fluid temperature and the wall temperature, and the specific heat of the fluid. Mass flow controllers employ a variety of mass flow sensor configurations. For example, one type of construction involves a stainless steel flow tube with two or more resistive elements in thermally conductive contact with the sensor tube. The resistive elements are typically composed of a material having a high temperature coefficient of resistance. Each of the elements can act as a heater, a detector, or both. One or more of the elements is energized with electrical current to supply heat to the fluid stream through the tube. If the heaters are supplied with constant current, the rate of fluid mass flow through the tube can be derived from temperature differences in the elements. Fluid mass flow rates can also be derived by varying the current through the heaters to maintain a constant temperature profile.

Such thermal mass flow sensors may be attached to a mass flow controller, with fluid from the controller's bypass tube feeding the capillary tube (also referred to herein as the sensor tube). Since mass flow measurements are dependent upon the temperature effects of the fluid upon the resistive elements, any external differential temperature imparted to the resistive elements could produce errors in the measurement of a mass flow rate. Unfortunately, thermal mass flow sensors are frequently operated in environments where an external thermal gradient might be imposed upon them. For example, a thermal mass flow sensor may be operated in close proximity to a valve coil that dissipates significant power as it operates. Heat generated from operation of the valve coil may be communicated through a conductive thermal path, such as that provided by a mass flow controller housing, to the mass flow sensor. The heat thus-communicated may impose a thermal gradient upon the mass flow sensor housing which could, in turn, superimpose the external thermal gradient upon the sensor's resistive elements, thus leading to errors in mass flow measurements.

A mass flow sensor that substantially eliminates externally imposed thermal gradients would therefore be highly desirable.

SUMMARY OF THE INVENTION

A mass flow controller in accordance with the principles of the present invention includes a sensor assembly, a valve assembly, and a mass flow controller housing to which the valve and sensor assemblies are attached. A thermally conductive element conducts heat from the valve assembly away from the sensor assembly, thereby reducing uncontrolled contributions of heat to the sensor assembly. In an illustrative embodiment, the mass flow controller includes a thermally conductive enclosure that substantially envelops the sensor and valve assemblies. The thermally conductive element substantially surrounds and makes thermally conductive contact with the valve assembly while, at the same time, making substantial conductive thermal contact with the enclosure.

In an embodiment that does not include the enclosure, the thermally conductive element may include structure on one or more surfaces that accelerate the dissipation of thermal energy from within the valve assembly. Such structure may include fins located on one or more exterior surfaces of the thermally conductive element that do not face the sensor assembly. The thermally conductive element may be composed of a high thermal conductivity material, such as aluminum. In an illustrative embodiment, the thermally conductive element is integral to the valve assembly. That is, in this illustrative embodiment, the exterior wall of the valve assembly is formed to conduct thermal energy away from the mass flow controller sensor assembly.

These and other advantages of the present disclosure will become more apparent to those of ordinary skill in the art after having read the following detailed descriptions of the preferred embodiments, which are illustrated in the attached drawing figures. For convenience of illustration, elements within the Figures may not be drawn to scale.

DETAILED DESCRIPTION OF DISCLOSURE

A mass flow controller in accordance with the principles of the present invention includes a mass flow sensor assembly and a valve assembly. In an illustrative embodiment, the mass flow sensor assembly is attached to the mass flow controller housing and includes a heat sink that is attached to the valve assembly housing and provides a low thermal impedance path to the surrounding atmosphere in order to dissipate heat generated through operation of the valve within the valve assembly.

Figure 1:
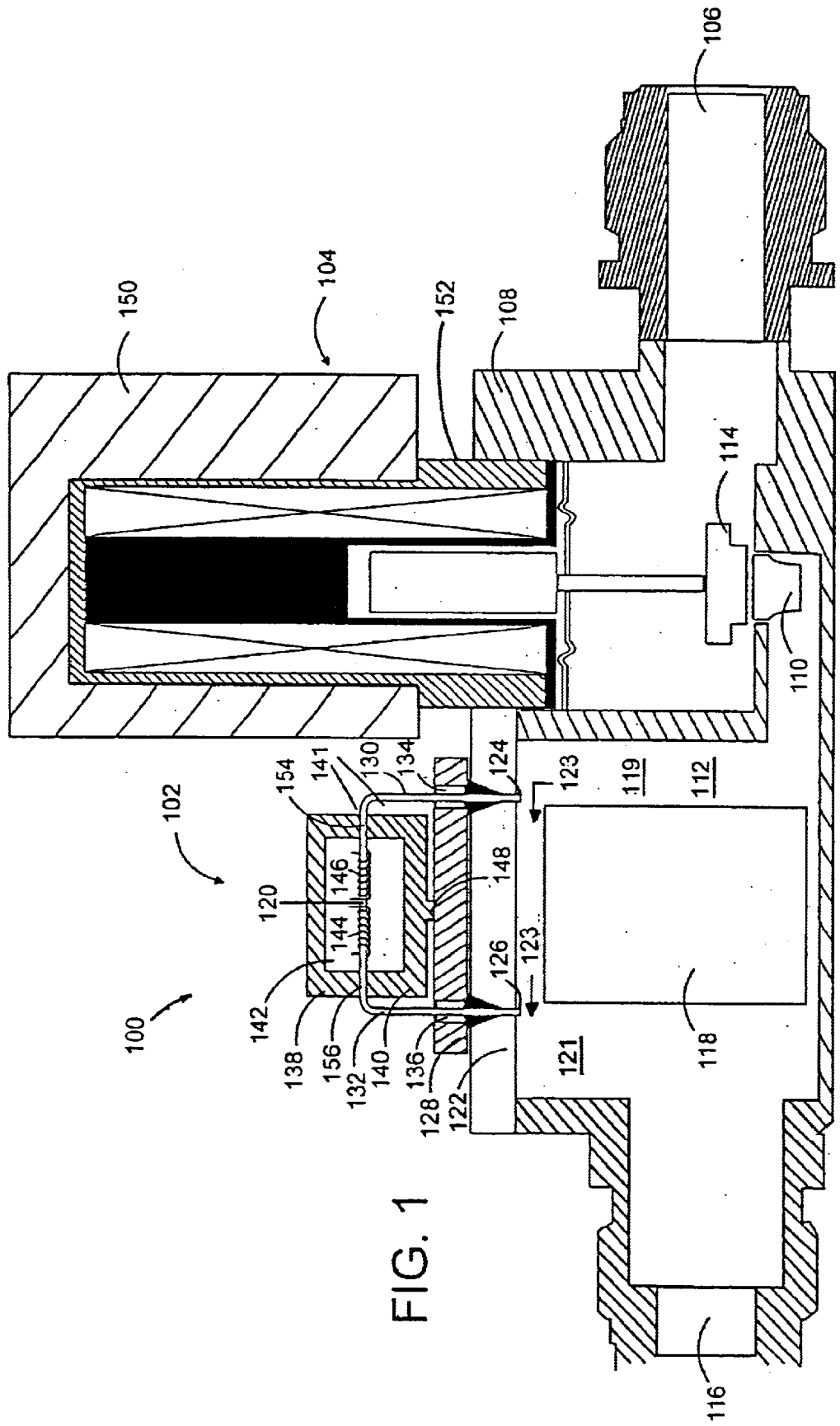
FIG. 1 is a sectional drawing of a mass flow controller in accordance with the principles of the present invention that employs heatsink that provides a thermally conductive path between the mass flow controller valve assembly and a thermally conductive mass flow controller enclosure.

The sectional view of FIG. 1 illustrates the major components of a mass flow controller in accordance with the principles of the present invention. The mass flow controller 100 includes a thermal mass flow sensor assembly 102 and a valve assembly 104. The valve assembly 104 is connected to the mass flow controller housing 108 to control the rate of flow of gas in response to control signals generated by a mass flow sensor circuitry described generally in the discussion related to FIG. 2. The mass flow controller 100 includes an inlet 106 for receiving a flow of gases to be metered. The process gas enters the mass flow controller though the inlet 106 and travels through the valved opening 110 to a bypass channel 112. The valve 114 operates under control of the mass flow sensor and related circuitry to admit a precisely measured quantity of process gas into the inlet port 106, through the controller, and out the outlet port 116 for a processing application, such as may be employed in integrated circuit manufacturing. The bypass channel 112 is connected to the inlet port 106 to receive and carry the stream of gas.

A laminar flow element 118 rests within the channel 112 and provides a pressure drop across the thermal mass flow sensor assembly 102 and drives a portion of the gas through the sensor tube 120 of the thermal mass flow sensor 102. The thermal mass flow sensor assembly 102 includes circuitry that senses the rate of flow of gas through the controller 100 and controls operation of the valve assembly 114. The thermal mass flow sensor assembly 102 is attached to a wall 122 of the mass flow controller that forms a boundary of the bypass channel 112. Input 124 and output 126 apertures in the wall 122 provide access to the mass flow sensor assembly 102 for a gas travelling through the mass flow controller 100. In this illustrative embodiment the mass flow sensor assembly 102 includes a baseplate 128 for attachment to the wall 122. The baseplate 128 may be attached to the wall and to the remainder of the thermal mass flow sensor assembly 102 using threaded hole and mating bolt combinations, for example. Input 130 and output 132 legs of the sensor tube 120 extend through respective input 134 and output 136 apertures of the baseplate 128 and, through apertures 124 and 126, enter the mass flow controller wall 122.

The mass flow sensor assembly includes top 138 and bottom 140 sections that, when joined, form a thermal clamp 141 that holds both ends of the sensor tube active area (that is, the area defined by the extremes of resistive elements in thermal contact with the sensor tube) at substantially the same temperature. The thermal clamp also forms a chamber 142 around the active area of the sensor tube 120. That is, the segment of the mass flow sensor tube 102 within the chamber 142 has, in thermal communication with it, two or more resistive elements 144, 146, each of which may act as a heater, a detector, or both. One or more of the elements is energized with electrical current to supply heat to the fluid as it streams through the tube 120.

The thermal clamp 141, which is typically fabricated from a material characterized by a high thermal conductivity relative to the thermal conductivity of the sensor tube, makes good thermally conductive contact with the portion of the sensor tube just downstream from the resistive element 144 and with the portion of the sensor tube just upstream from the resistive element 146. The thermal clamp thereby encloses and protects the resistive elements 144 and 146 and the sensor tube 120. Additionally, the thermal clamp 141 thermally "anchors" those portions of the sensor tube with which it makes contact at, or near, the ambient temperature. In order to eliminate even minute errors due to temperature differentials, the sensor tube may be moved within the thermal clamp to insure that any difference between the resistance of the two coils is due to fluid flow through the sensor tube; not to temperature gradients imposed upon the coils from the environment.

A heat sink 150 is attached in good thermal communication with the housing 152 of the valve assembly 104. Power dissipated by a solenoid in operation of the valve 114 may generate a significant amount of heat that might travel through the mass flow controller housing 108 and superimpose an external thermal gradient upon the sensor assembly 102. Such an external thermal gradient superimposed on the sensor resistive elements 144 and 146 would create an error in the determination of mass flow through the sensor tube. That is, since the thermal mass flow sensor assembly 102 relies upon the tendency of the fluid flowing through the sensor tube 120 to establish a thermal gradient to measure the mass of fluid flowing through the tube 120, an externally imposed thermal gradient would render a false reading. In this illustrative embodiment, the heat sink 150 substantially envelopes the valve assembly housing 152 and conducts heat away from the valve assembly housing 152.

In an embodiment in which the heat sink 150 is open to the atmosphere, features such as fins 151 may be added to the heat sink to increase the transport of heat away from the valve assembly housing 152 and away from the sensor assembly 102. That is, fins may be added to one or more sides of the heat sink 150 not facing the sensor assembly 102 in order to increase convective and radiant heat transport away from both the sensor assembly 102 and the valve assembly 104. Alternatively, in an illustrative embodiment described in the discussion related to FIGS. 3 and 4, the heat sink 150 extends to make thermally conductive contact with a controller housing 164 that encloses the thermal mass flow sensor 102 and valve 104 assemblies. In such an embodiment, a smooth-surfaced heat sink 150 provides greater surface contact with the controller housing and thereby provides a more substantial thermally conductive path for dissipation heat from the valve assembly 104. A mass flow controller in accordance with the principles of the present invention such as presented in the illustrative embodiment of FIG. 3 employs both a heat sink 150 and thermal ground 148 to substantially eliminate thermal gradients that might otherwise impair operation of the thermal mass flow sensor assembly 102.

Figure 2:
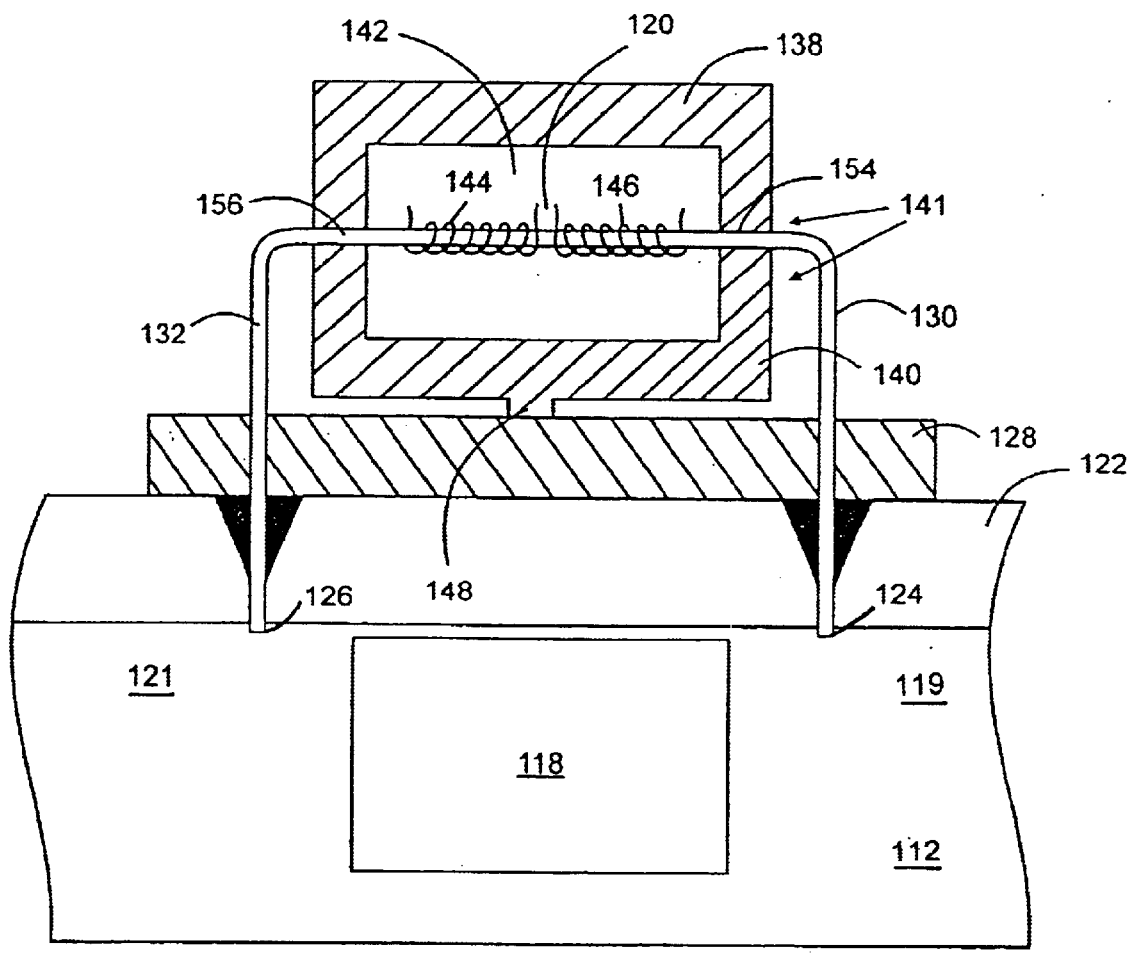
FIG. 2 is a partial conceptual block diagram and partial sectional drawing of a mass flow rate sensor assembly in accordance with the principles of the present invention.

FIG. 2 illustrates in greater detail an embodiment of a mass flow sensor in accordance with the principles of the present invention. The bypass tube 112, laminar flow element 118, upstream resistive element 146 and downstream resistive element 144 are as previously described. The arrangement of the thermal clamp 141, including top 138 and bottom 140 portions, and its thermally conductive communication with the sensor tube 120 is illustrated in greater detail here. The broken lines of the sensor tube 120 indicate that the tube is substantially surrounded and in conductive thermal contact with the thermal clamp 141 around its entire circumference at each end of its operational segment. The operational segment of the sensor tube is defined for illustrative purposes as that segment of the sensor tube disposed between the upstream 154 and downstream 156 legs of the thermal clamp.

One end of the bypass tube 112 defines an input port 119 and the other end of the bypass tube 112 defines an output port 121 so that fluid may flow from the input port 119 to the output port 121 in a downstream direction indicated by arrows 123. The laminar flow element 118 is disposed within the bypass tube 112 for restricting the flow of fluid through the bypass tube 112. An upstream end of the sensor tube 120 couples to the bypass tube between the input port and the laminar flow element. A downstream end of the sensor tube 120 couples to the bypass tube 112 between the laminar flow element 118 and the output port 121, a fixed proportion of the total mass of fluid flowing from the input port 119 to the output port 121 flows through the sensor tube 120. The sensor tube 120 may be of capillary dimensions and is fabricated from a material, such as steel, that is characterized by a relatively high thermal conductivity in comparison to the thermal conductivity of the fluid.

Each of the resistive elements 144 and 146 includes a thermally sensitive resistive conductor that is wound around a respective portion of the sensor tube 120, each successive turn of the conductors being placed close to the previous turn. Each of the resistive elements extends along respective portions of the sensor tube 120 along an axis defined by the operational segment of the sensor tube 120. Downstream resistive element 144 is disposed downstream of the resistive element 146. The elements abut one another or are separated by a small gap for manufacturing convenience and are electrically connected at the center of the tube. Each resistive element 144, 146 provides an electrical resistance that varies as a function of its temperature. The temperature of each resistive element 144, 146 varies as a function of the electrical current flowing through its resistive conductor and the mass flow rate within the sensor tube 120. In this way, each of the resistive elements 144, 146 operates as both a heater and a sensor. That is, the element acts as a heater that generates heat as a function of the current through the element and, at the same time, the element acts as a sensor, allowing the temperature of the element to be measured as a function of its electrical resistance. The mass flow sensor 102 may employ any of a variety of electronic circuits, typically in a Wheatstone bridge arrangement, to apply energy to the resistive elements 146 and 144, to measure the temperature dependent resistance changes in each element 144, 146 and, thereby, the mass flow rate of fluid passing through the tube 120. Circuits employed for this purpose are disclosed, for example, in U.S. Pat. No. 5,461,913, issued to Hinkle et al and U.S. Pat. No. 5,410,912 issued to Suzuki, both of which are hereby incorporated by reference in their entirety.

In operation, fluid flows from the input port 119 to the output port 121 and a portion of the fluid flows through the restrictive laminar flow element 118. The remaining fluid flows through the sensor tube 120. The circuit (not shown) causes an electrical current to flow through the resistive elements 144 and 146 so that the resistive elements 144 and 146 generate and apply heat to the sensor tube 120 and, thereby, to the fluid flowing through the sensor tube 120. Because the upstream resistive element 146 transfers heat to the fluid before the fluid reaches the portion of the sensor tube 120 enclosed by the downstream resistive element 144, the fluid conducts more heat away from the upstream resistive element 146 than it does from the downstream resistive element 144. The difference in the amount of heat conducted away from the two resistive elements is proportional to the mass flow rate of fluid within the sensor tube 120 and, by extension, the total mass flow rate through the mass flow rate controller 100 from the input port 119 through the output port 121. The circuit measures this difference by sensing the respective electrical resistances and generates an output signal that is representative of the mass flow rate through the sensor tube 120.

The baseplate 122 may be integral to the thermal mass flow sensor assembly 102 or it may be attached to the assembly 102 through any of a variety of attachment means, such as threaded through-holes and bolts, for example. The baseplate 122 is configured to provide a thermal path between the sensor assembly 102 and the remainder of the mass flow controller 100 and to thereby maintain the average temperature of the sensor assembly 102 and the remainder of the mass flow controller at substantially the same average temperature.

Figure 3:
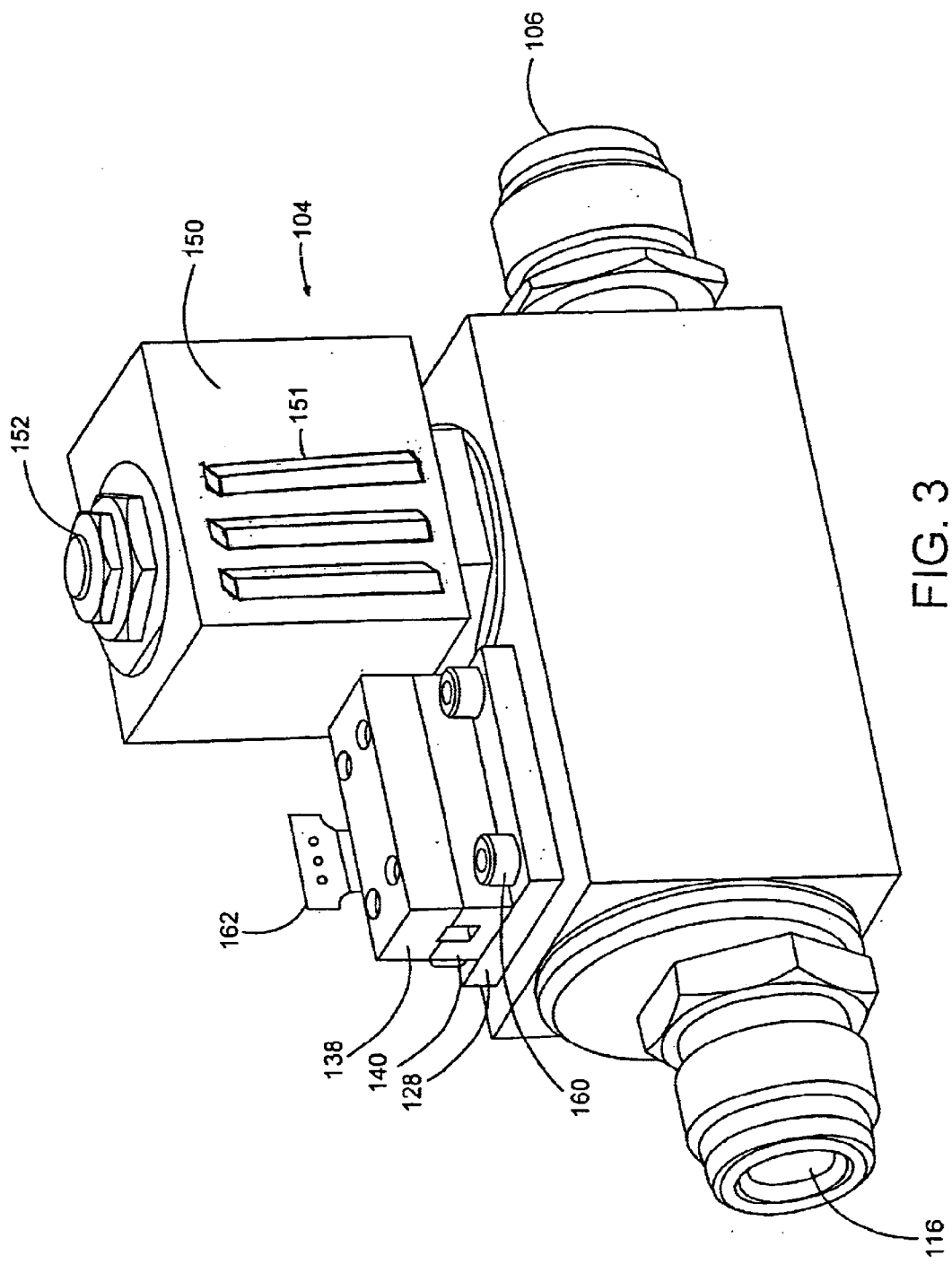
FIG. 3 is a perspective view of the exterior of a mass flow rate controller in accordance with the principles of the present invention.

The perspective view of FIG. 3 provides an external view of the sensor assembly and valve assembly as previously described. The valve assembly includes a heatsink 150 that is formed to provide a substantial thermal path between the valve assembly 104, the heatsink 150 and an enclosure 164 to be described in the discussion related to FIG. 4. The inlet 106 and outlet 116 ports are as previously described. The sensor assembly 102 includes top 138 and bottom 140 thermal clamp components attached to the wall of the controller assembly through the baseplate 128. The baseplate 128 is held in position with bolts 160. Mass flow controller electronics (not shown) are attached to the controller with a metal flange 162. Exterior surfaces of the heatsink 150 make conductive contact with the interior surfaces of a controller enclosure. In this illustrative embodiment, at least three exterior surfaces of the heatsink make thermally conductive contact with the thermally conductive enclosure; which three exterior surfaces of the heatsink will be apparent from examination of FIG. 4.

Figure 4:
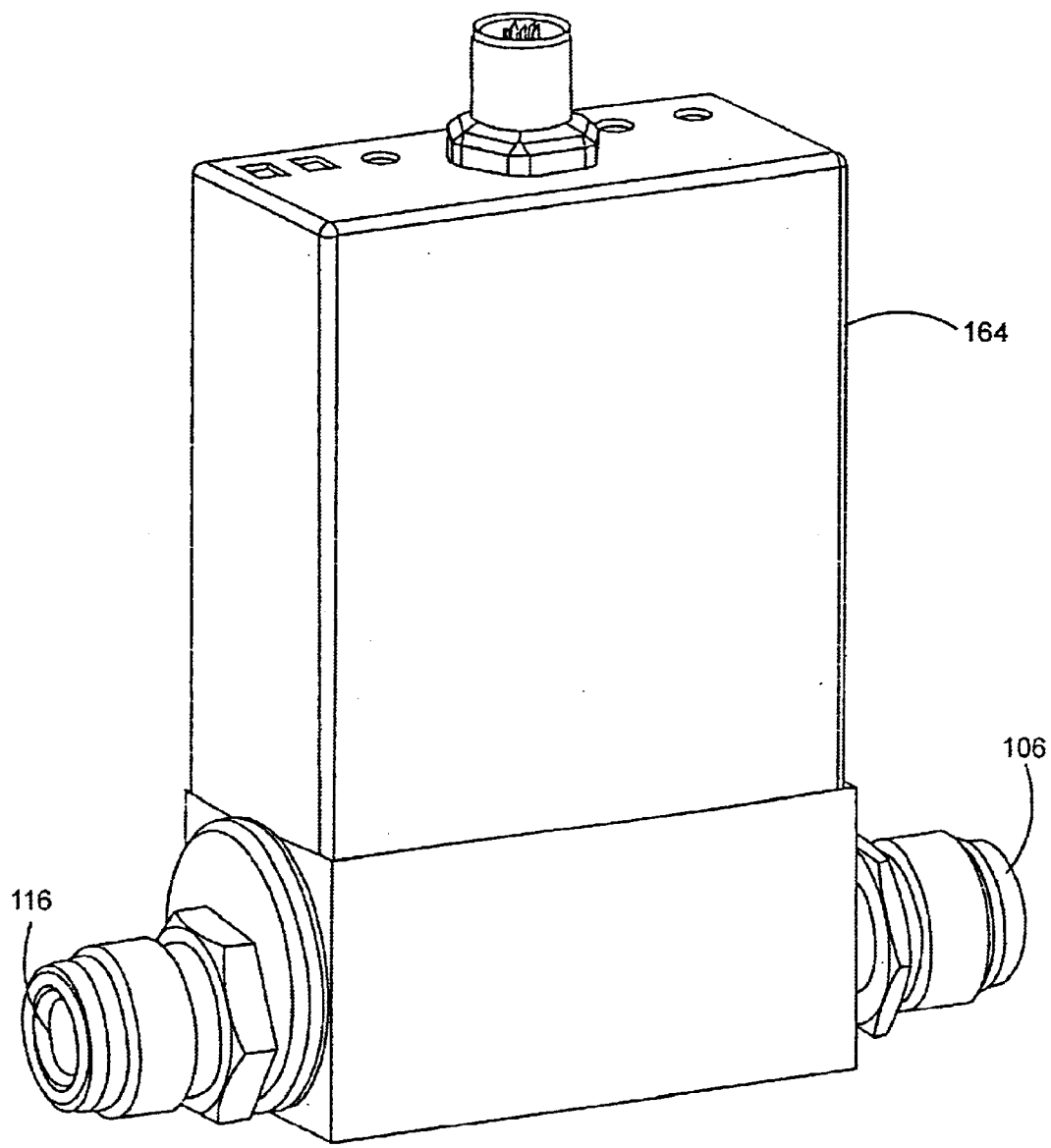
FIG. 4 is a perspective view of the exterior of a mass flow controller in accordance with the principles of the present invention, which includes a thermally conductive enclosure.

The perspective view of FIG. 4 illustrates a view of a mass flow controller assembly in accordance with the principles of the present invention in which a thermally conductive enclosure 164 envelopes the valve assembly 104 and thermal mass flow sensor assembly 102, as previously described. A heatsink that makes conductive thermal contact with the valve assembly may also make thermal contact with the enclosure 164. The enclosure may also incorporate features, such as fins, to accelerate heat exchange between the enclosure's interior and exterior.

While there have been illustrated and described particular embodiments of the present disclosure, it will be appreciated that numerous changes and modifications will occur to those skilled in the art. Accordingly, it is intended that the appended claims cover all those changes and modifications which fall within the true spirit and scope of the present disclosure.

What is claimed is:

1. A thermal mass flow controller comprising:
   a thermal mass flow controller housing including a fluid input port and a fluid output port and a bypass channel disposed between the input and output ports;
   a thermal mass flow sensor assembly mounted to the thermal mass flow controller housing for measuring a flow of fluid through the bypass channel;
   a valve assembly mounted to the thermal mass flow controller housing for controlling the flow of fluid through the bypass channel; and
   a heat sink device thermally coupled to the valve assembly for conducting thermal energy from the valve assembly.

2. The thermal mass flow controller of claim 1 wherein the heat sink device includes a mass which substantially surrounds the valve assembly.

3. The thermal mass flow controller of claim 2 wherein the valve assembly is mounted to the thermal mass flow controller housing proximate the fluid input port.

4. The thermal mass flow controller of claim 3 wherein the thermal mass flow sensor assembly is mounted proximate the fluid output port.

5. The thermal mass flow controller of claim 4 wherein a greater portion of the mass is disposed on a side of the valve assembly opposite the thermal mass flow sensor assembly.

6. The thermal mass flow controller of claim 4 further including an enclosure device coupled to the thermal mass flow controller housing and enclosing the thermal mass flow sensor assembly and the valve assembly therein, the enclosure device contacting the heat sink device thereby forming a conductive thermal path from the heat sink device to an area external to the enclosure device through the enclosure device.

7. The thermal mass flow controller of claim 2 wherein a greater portion of the mass is disposed on a side of the valve assembly opposite the thermal mass flow sensor assembly.

8. The thermal mass flow controller of claim 7 wherein said greater mass is positioned on the heat sink device such that the thermal energy from the valve assembly is conducted away from the thermal mass flow sensor assembly.

9. The thermal mass flow controller of claim 2 wherein the heat sink device includes fins mounted to a surface thereof for accelerating the conduction of thermal energy from the valve assembly.

10. The thermal mass flow controller of claim 9 wherein the fins are positioned on the heat sink device such that the thermal energy from the valve assembly is conducted away from the thermal mass flow sensor assembly.

11. The thermal mass flow controller of claim 2 further including an enclosure device coupled to the thermal mass flow controller housing and enclosing the thermal mass flow sensor assembly and the valve assembly therein, the enclosure device contacting the heat sink device thereby forming a conductive thermal path from the heat sink device to an area external to the enclosure device through the enclosure device.

* * * * *